Jan. 17, 1928.  
J. P. SINGISER  
CUTTER GRINDER  
Filed March 2, 1923  
1,656,244  
6 Sheets-Sheet 1

Fig. 1.

Inventor:  
John P. Singiser  
By Gillson & Marm  
Att'ys

Jan. 17, 1928.

J. P. SINGISER 1,656,244

CUTTER GRINDER

Filed March 2, 1923

Inventor:
John P. Singiser

Jan. 17, 1928.  1,656,244
J. P. SINGISER
CUTTER GRINDER
Filed March 2, 1923   6 Sheets-Sheet 6

Inventor:
John P. Singiser
By
Attys.

Patented Jan. 17, 1928.

1,656,244

UNITED STATES PATENT OFFICE.

JOHN P. SINGISER, OF CHICAGO, ILLINOIS, ASSIGNOR OF ONE-HALF TO MAX E. LEHMANN, OF CHICAGO, ILLINOIS.

CUTTER GRINDER.

Application filed March 2, 1923. Serial No. 622,299.

This invention relates to abrading or grinding machines and has reference more particularly to machines for grinding the blades of cutting tools such as the blades on milling cutters, or cutting heads for milling machines and the like.

One of the objects of the invention is the provision of means for grinding the blades on milling cutters or heads without removing the blades from the cutter. Another object of the invention is the provision of suitable guiding means for the grinding element whereby blades having straight, angular, curved, or other types of cutting edges, and arranged on cylindrical, or non-cylindrical, heads may be efficiently, expeditiously and uniformly ground without removing the blades from the heads. Another object is the provision of means for adjusting the cutter head and the grinding element relatively to each other so that the blades of any type of cutter may be properly ground whether they be arranged on the periphery or side face of the cutter head; and that, without removing the blades from the head. A still further object of the invention is the provision of means for manipulating or controlling the grinding operation with accuracy and ease together with means whereby the cutter head may be easily and readily secured to, or removed from, its support.

Other and further objects and advantages of the invention will appear as the description proceeds.

On the drawing the reference numeral 10 designates a base, or support, for the grinding mechanism. This base, or support, may be of any suitable or well known construction. That shown is in the form of a casing and comprises the front wall 11, rear wall 12, the end walls 13 and 14 and the top wall 15. The front wall 11 may, if desired, be provided with a door 16 hinged to the same in the usual manner. The base is adapted to contain a motor 17, provided with an armature shaft 16 on which is mounted the pulley 19.

Suitable means are provided for holding the tool to be ground. This means is so arranged that the tool mounted thereon may be adjusted to properly present the edge of the tool that is to be ground to the grinding element. This means is also so constructed that it may be moved from beneath the grinding element in order that the tool may be readily attached to or removed from the same. As shown, this supporting means consists of a sleeve 20 provided with a flange 21 intermediate the ends thereof whereby the sleeve may be secured in an opening 22 in the top cover 15 of the casing 10.

Slidably and rotatably mounted within the sleeve 20 is a standard 23 to which the tool supporting head 24 is adapted to be secured by any suitable means. The standard 23 may be vertically adjusted by the screw 20$^a$ which is rotated by the hand wheel 20$^b$. The standard may be clamped in adjusted position by the bolt 20$^c$ engaging the ears 20$^d$ of the split portion of the sleeve. A bracket 25 is adapted to be clamped to the upper end of the standard 23, as by means of the bolt 26. The bracket 25 is provided with laterally extending perforated ears 27 and 28 between which the tool supporting head 24 is adapted to be pivoted, as by means of the shaft 29. The tool supporting spindle 30 is journaled in the head 24 in any suitable manner. As shown, ball bearings 31 are provided which are retained in a suitable opening in the head 24 by means of the nut 32, a suitable retaining member 33 secured to the inner end of the spindle 30 to prevent withdrawal of the same.

Figure 7:
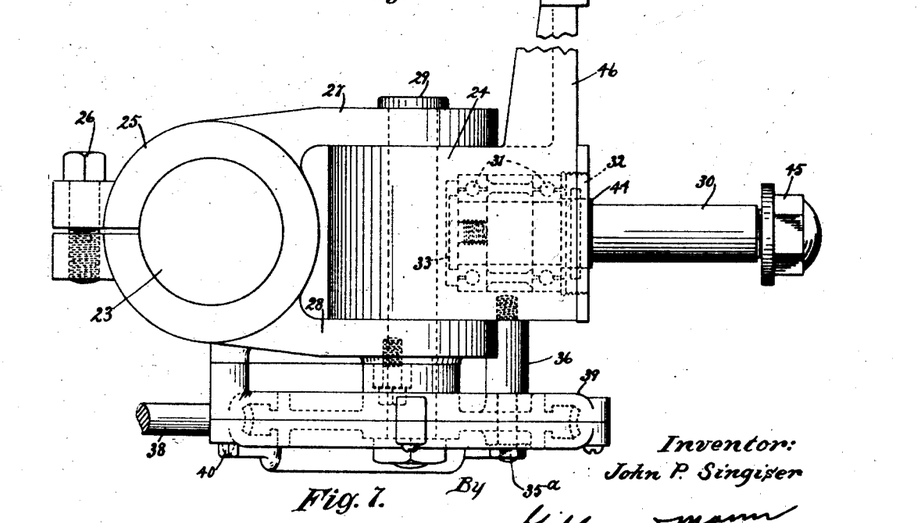
Fig. 7 is a plan view of the same.

Suitable means are provided for adjusting the head 24 about the pivot 29. Any suitable mechanism may be employed for this purpose. That shown comprises a worm gear 35 which is rigidly secured in any suitable manner to the pivot 29 and is caused to move with said head by means of the bolt 35ª which extends through said wheel and through a spaced sleeve 36 and is tapped into said head 24, as indicated in Fig. 7.

The worm gear is operated by means of the worm 37 which is integral with the shaft 38 and suitably journaled in the casing 39 which, in turn, is rigidly secured to the bracket 25, as by means of the bolts 40. The outer end of the shaft 38 may be squared, as at 41, for the reception of a suitable wrench for operating the same. The casing 39 may be in two parts, as indicated in Fig. 7, and is adapted to protect the periphery of the worm gear 35. The side face of the worm gear 35 may be graduated, as shown at 34ª, for the purpose of indicating the angular adjustment of the head 24. The spindle 30 is adapted to receive the tool to be ground, such as the milling cutter head 42 in which is secured the tools, or blades, 43. When the milling cutter head is placed on the spindle 30 it may be clamped against the shoulder 44 by any suitable means, such as the nut 45.

Suitable means are provided for adjustably supporting guiding cams. As shown, the head 24 is provided with a laterally extending arm 46 terminating in elongated rectangular extension 47 and a central screw-threaded stud 48. A cam supporting plate 49 provided with a rectangular groove 50, as indicated at dotted lines in Fig. 12 (see Fig. 15), is adapted to be mounted on the outer end of the arm 46 with the rectangular member 47 engaging said groove to prevent turning of said plate. A nut 51 on the outer end of the stud 48 prevents the removal of said plate. The plate 49 may be adjusted along the member 47 and held in adjusted position by any suitable means, such as the set screws 52 and 53 engaging a gib 54 which, in turn, engages the rectangular member 47. One end of the plate 49 is adapted to be provided with a vertically arranged guiding groove 55, shown in dotted lines in Figs. 12 and 13, and clearly shown in Fig. 15.

A guiding or master cam 56 is provided with a slotted shank 57 which is adapted to engage the groove 55 and is retained by a bolt 58. The guiding or master cam 56 is adapted to be held in adjusted position by means of a set screw 59 in the usual manner. The other end of the plate 50 is provided with an extension 60 to which is adapted to be pivotally secured another master or guiding cam 61. The master cam 61 is provided with an extension 62 in which is arranged the slot 63. The master cam 61 is secured to the extension 60 by means of the bolt 64, which extends through the opening 65 in the extension 60 and through the circular opening in the graduated plate 66, as clearly shown in Fig. 10 of the drawings. The graduated plate 66 is provided with an angular hub 67, which is adapted to engage in the slot 63 to prevent turning of said plate relatively to the master cam 61. The plate 66 may be graduated, if desired, in order to indicate the angle at which the master cam 61 may be adjusted. The outer end of the bolt 65 is screw threaded and provided with a nut 68. In order to maintain the parts under more or less friction during the adjusting of the master cam, the extension may be provided with a counter bore 69 in which a spring may be placed for engagement between the nut 68 and the extension 60.

In the construction of grinding machines it is necessary to provide means for moving either the tool to be ground or the grinding element, in order that the grinding tool may be properly moved along the edge of the tool that is being ground. In the embodiment disclosed, means are provided whereby the grinding element may be moved along the cutting edge of the blade or tool.

As shown the tool supporting member 70 is pivotally mounted on the base, or casing 10. Any suitable means may be provided for this purpose. As shown, the upper wall or top plate 15 of the casing 10 is provided with an opening 71 over which a plate 72 is adapted to slide. The wall 15 is provided with elongated slots 73 through which extend bolts 74 which are secured to the plates 72 above the top plate or wall 15 and to the frame members 75, 76, beneath said plate, or top wall 15. Plate 72 is moved either to the right or to the left by means of a hand wheel 77, which is provided with a threaded shaft which engages threaded nuts carried by the frame member 99 rigidly secured to the plate 72. The supporting member 70 is pivoted to the plate 72, as at 78. The plate 72 may be provided with contact points 79 and 80, against which set screws 81 and 82 are adapted to engage. The set screws 81 and 82 are adjustably secured in the ears 83 and 84 which are carried by the supporting member 70. These set screws may be adjusted in order to limit the oscillatory movement of the supporting member 70. The plate 72 may, if desired, be provided with the metallic shields 85 and 86, to prevent the entrance of dirt and other foreign matter into the casing 10 through the opening 71. A hollow arm 87 is adapted to be pivoted to the upper end of the supporting member 70 by any suitable means such as by means of pivots, or trunnions, 88, 88. The upper end of the supporting member 70 may be provided with a dust cap 89 for closing the same. The arm 87 may be provided with an arcuate shield 89ª which is adapted to cooperate with the dust cap 89 to prevent the entry of dust and other foreign matter into the supporting member 70. The inner end of the arm 87 is provided with an arcuate extension 90, the free end of which is provided with bearings 91 for shaft 92, rotatably mounted in said arm. Suitable bearings 93 are provided for said shaft in the outer end of the arm 87. A suitable grinding element 94 is rigidly secured in any suitable manner to the outer end of the shaft 92 and is rotatable therewith. The periphery of the grinding element 94 is transversely curved in order that the same may be normal to the cutting edge of the tool that is being ground at any angular position of the arm 87. The arm 87 is adapted to pivot about the pivots or trunnions 88, but it may be held in fixed position by means of a pin which is adapted to engage an aperture 90ª in the support 70 and a corresponding aperture 90ᵇ in the extension 90 of the arm 87.

A pulley 95 is rigidly secured to the shaft 92 in such a position that the center of said pulley will be on the axis of the pivots 88. The pulley 95 is operated by means of a belt 96 from the pulley 19, on the armature shaft of the motor 17. Suitable belt guides 97 and 98 are rigidly secured to the arcuate member 90 beneath the pulley 95 in such a position as to turn the belt 96 through an angle of 90 degrees. The plate 72 is provided with a frame member or extension 99 on which is mounted the idler pulleys, or belt guides, 100 and 101. The axis of the guides 98 and 100 are in the same plane and likewise the axis of the guides 97 and 101. By this arrangement it will be seen that when the supporting member 70 is oscillated the belt is flexed flatwise of the same.

Figures 8, 9, 10, 11:
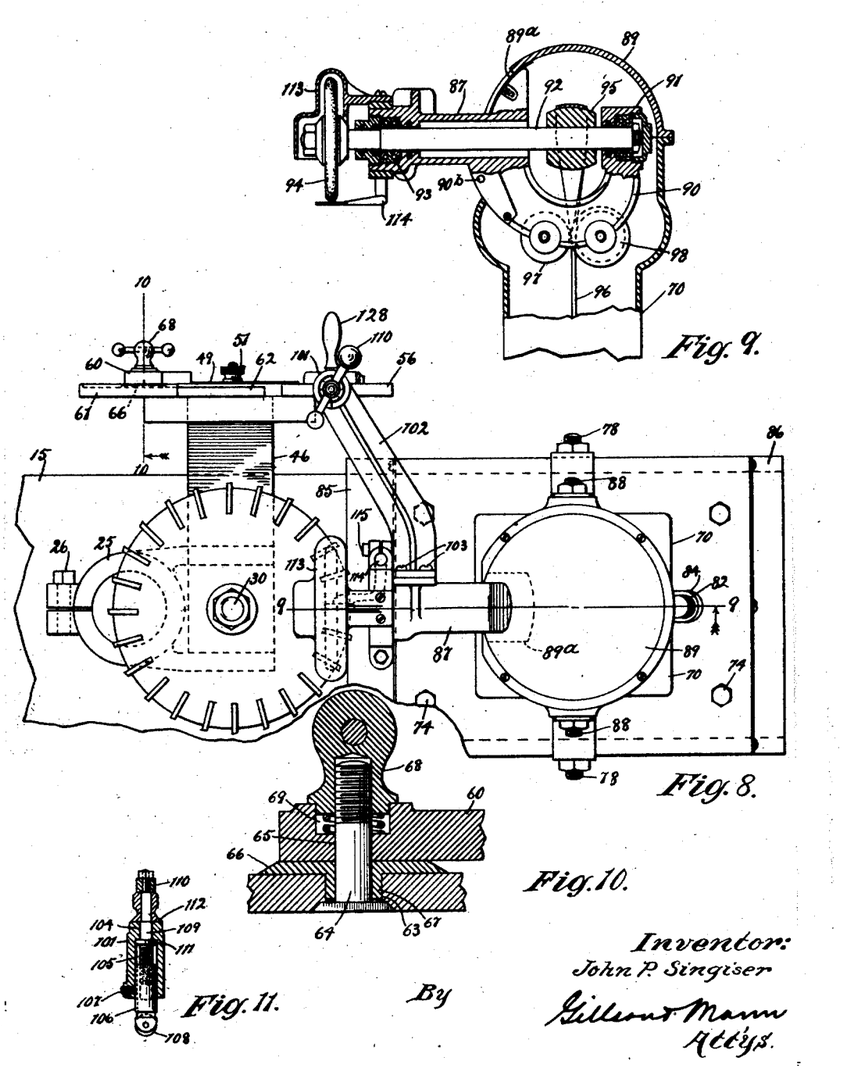
Fig. 8 is a plan view of the device with parts broken away.
Fig. 9 is a section on line 9—9 of Fig. 8.
Fig. 10 is a section on line 10—10 of Fig. 8.
Fig. 11 is a detailed sectional view of the guiding member.

Suitable means are provided for guiding either the grinder element or the tool that is being ground. As shown, the guiding member is carried by the arm that supports the grinding element. The arm 87 is adapted to be rigidly attached to the guiding arm, or member, 102, as by means of the screws 103. The outer end 101 of the guiding arm is provided with an aperture 104 having the counter bore, as at 105 (Fig. 11). A guiding or cam contacting member 106, is slidably mounted in the counter bore 105 of said arm. The member 106 may be provided with a groove into which the set screw 107 may engage to prevent rotation of this member. The lower end of the guide may be provided with a roller 108 for engaging the cam face or guide surface of the master cams.

Only one cam is used at a time and its face is so constructed and adjusted that it is parallel with the cutting edge of the tool that is being ground. Means are provided for making the final or nice adjustment of the grinding element 94 to compensate for wear in the grinding element and for properly adjusting the grinding element to the cutting edge of the blade to be ground. This means consists of a stem 109 provided with a screw-threaded lower end for engaging the member 106. The stem is turned by the handle 110 and is limited in its vertical movement by the collar 111. A graduated plate 112 secured to the stem 109 will indicate the vertical adjustment of the grinding element.

Attached to the outer end of the arm 87 is a casing 113 which is adapted to cover the upper portion of the element 94.

A suitable guiding finger 114 adjustably secured to the arm 87, as by means of the bolt 115, is provided for the purpose of engaging the side of the blade or tool that is being ground in order to determine the proper lateral movement of said blade or tool.

Figures 12, 13, 14, 15:
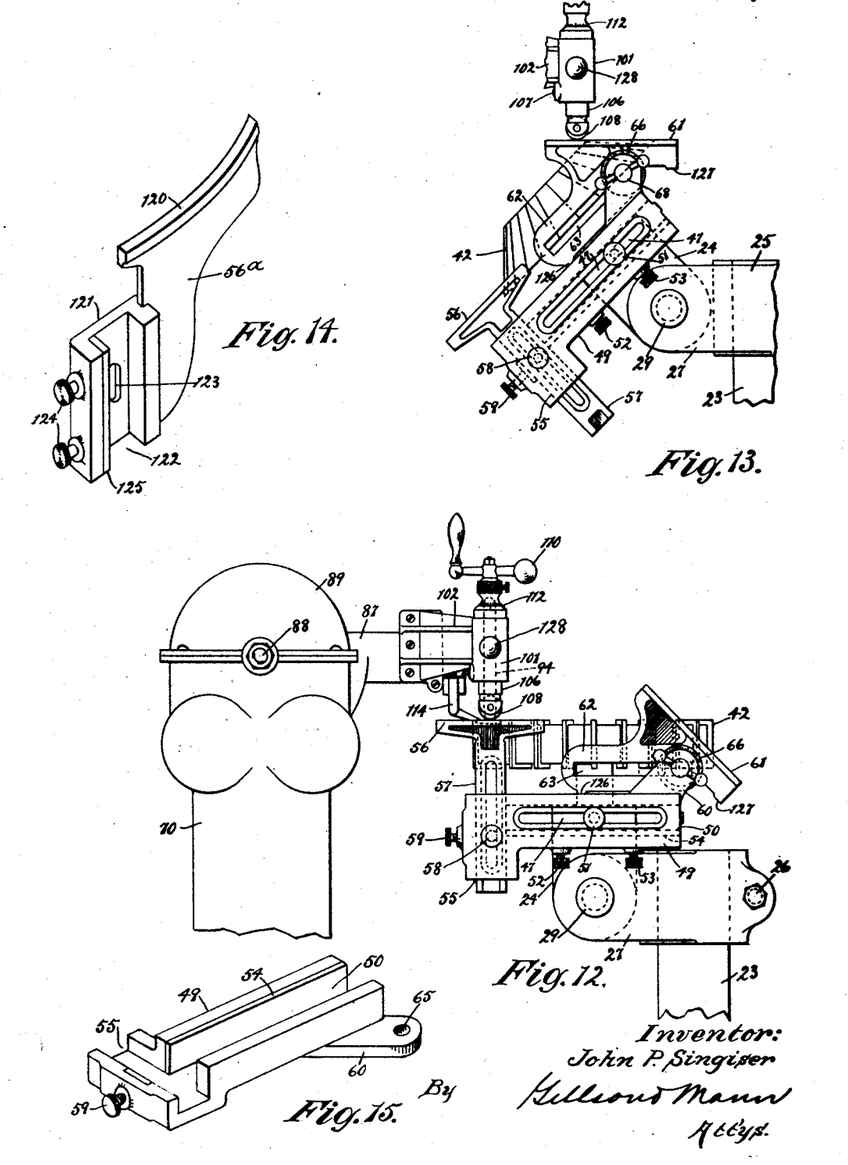
Fig. 12 is a side elevation of Fig. 8, with parts broken away.
Fig. 13 is a side elevation of the supporting head, showing the guiding cam adjusted for grinding the blades of a conical milling cutter head.
Fig. 14 is a modified form of guiding cam.
Fig. 15 is a perspective view of the cam supporting plate shown in Fig. 12.

In Fig. 14 is shown a modified form of master cam member. In this form the cam member 56ª differs from the corresponding cam member 56 in that the guiding face thereof is curved, as shown at 120, for the purpose of guiding the grinding member along the cutting edge of a curved blade. The cam member 56ª is provided with an extension 121 provided with the channel 122 which is adapted to engage the rectangular end 47 of the arm 46, the stud 48 extending through the slot 123 at the base of channel 122. Set screws 124 and a gib 125 are adapted to hold the cam member in adjusted position on the arm 46 in the usual manner.

Figure 1:
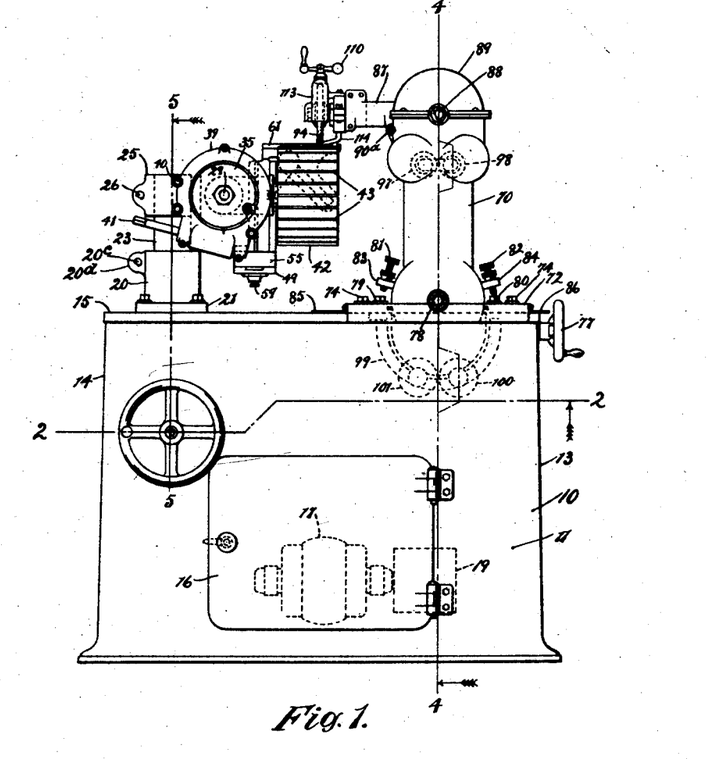
Fig. 1 is a side elevation of the device.
Figure 2:
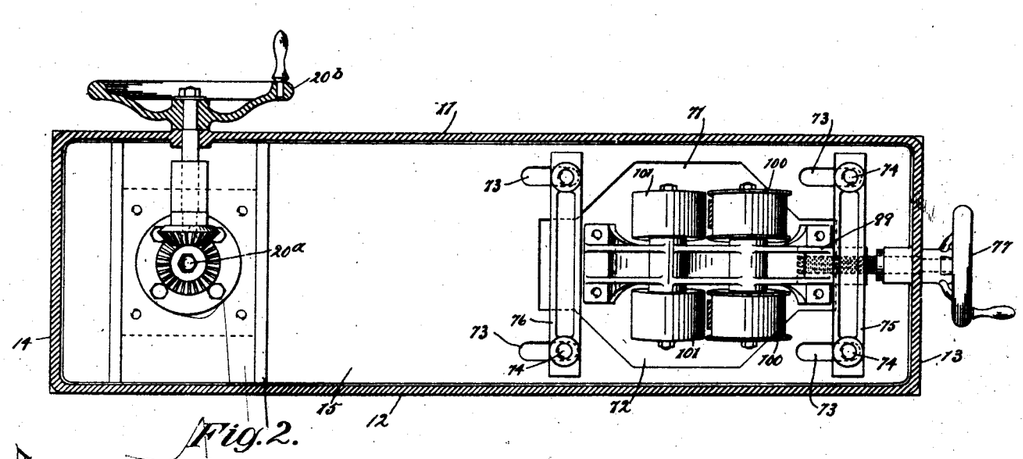
Fig. 2 is a section on the line 2—2 of Fig. 1, looking in the direction of the arrow.
Figure 3:
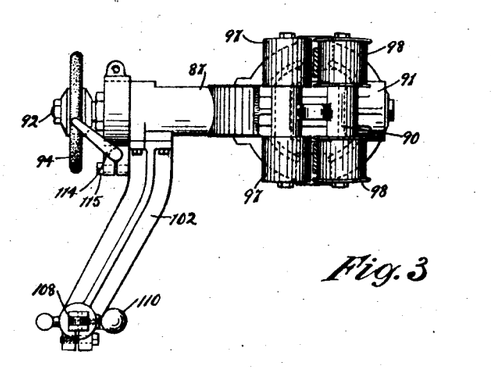
Fig. 3 is a detailed view showing the grinder and guiding arm.
Figures 4, 5:
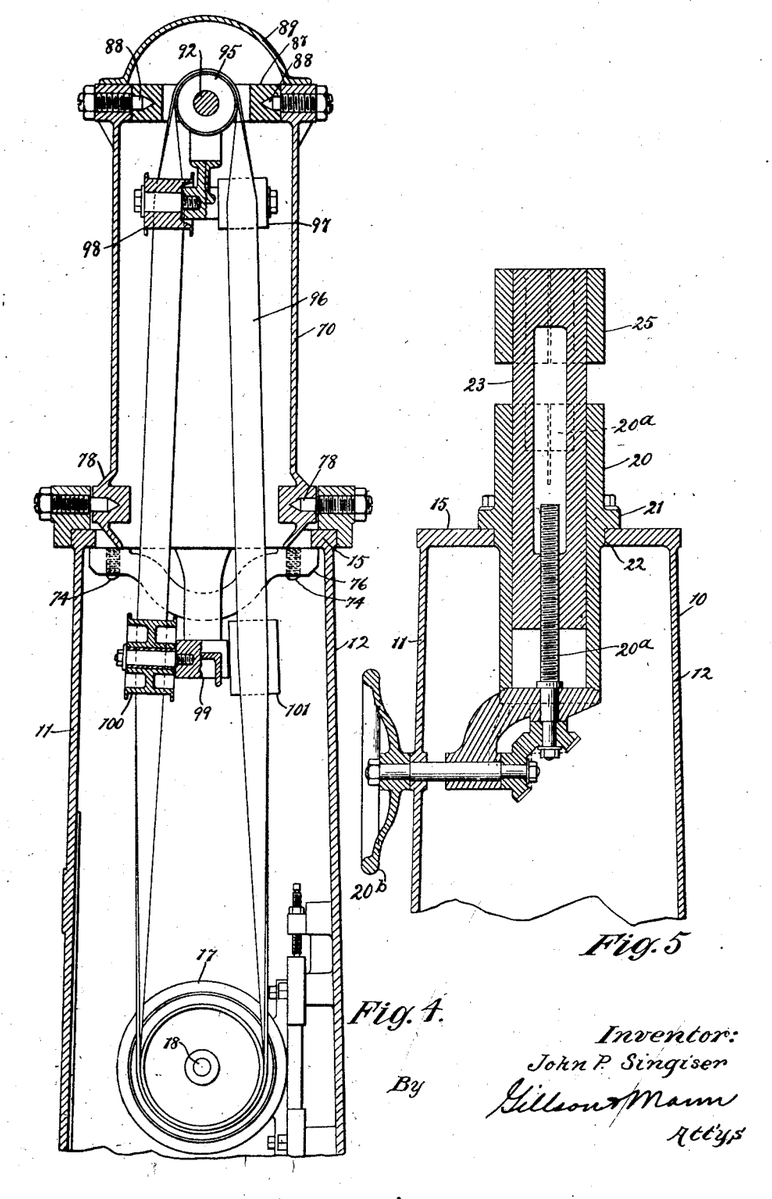
Fig. 4 is a section on line 4—4 of Fig. 1, looking in the direction of the arrow.
Fig. 5 is a section on the line 5—5 of Fig. 1.
Figure 6:
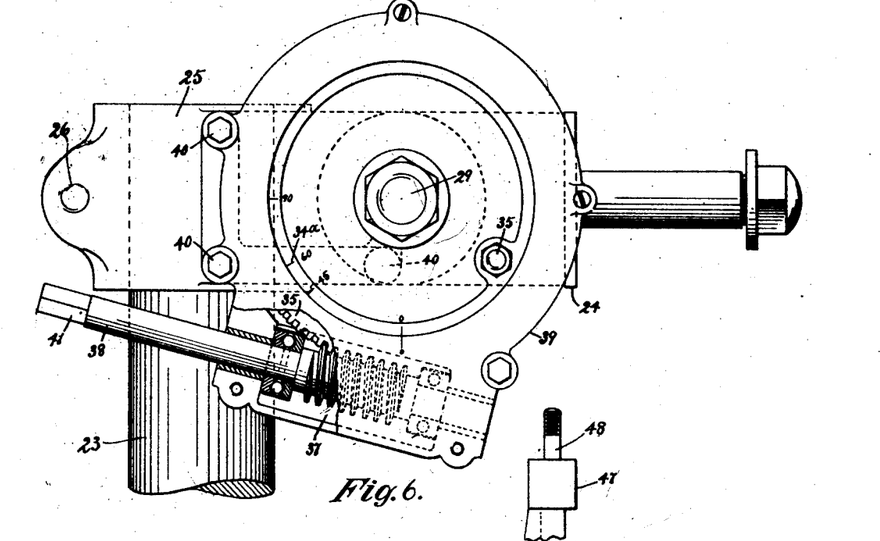
Fig. 6 is a side elevation of the tool supporting head, with parts broken away and parts in section.

In the operation of the device, when it is desired to grind the blades of a milling cutter, for instance, the standard 23 is rotated until the head 24 is turned away from the grinding element 94. The head 24 may then be rotated to cause the spindle 30 to assume a vertical, horizontal or any intermediate position by turning the worm 37 in the usual manner. The milling cutter head, as the head 42, is then placed on the spindle 30 and secured thereon. The proper master cam member is then properly adjusted and the head 24 and spindle 30 are adjusted to the proper angle. If the side edges of the cutter blades 43 are to be ground the spindle 30 is adjusted to horizontal position and the master cam member 56 is properly adjusted, as shown in Fig. 1. If the end edges of the cutter blades are to be ground the spindle 30 is turned to vertical position, as shown in Fig. 12. If a milling head having the cutter blades conically arranged is to be ground, the spindle 30 is arranged to an angle and the master cam member 61 is employed and is properly adjusted.

It will be noted that the cam member 61 is provided with contact members 126 and 127, which are adapted to contact the plate 50 to limit the adjustment of the cam member 61, and to assist in holding the same firmly in either extreme position. The milling cutter head is then turned beneath the grinding element 94, after which, by turning the handle 110, the guiding arm 102 may be adjusted to vertically adjust the grinding element 94.

The operator stands at the left of the machine, as shown in Fig. 1, and, grasping the handle 128, moves the grinding element back and forth while the same is being rotated by the motor 17. With his right hand he holds the cutter head with the blade against the guiding finger 115, and turns the cutter head to grind the blades successively. The ball bearings for the spindle 30 enables the operator to turn the cutter head with ease, even though the same may weigh many pounds.

It will thus be seen that by the cam engaging roller 108 traveling along the face of the master cam and determining the vertical movement of the grinding element, and the guiding finger 115 engaging the blade that is being ground, a uniformity in the grinding of the blades of the cutter is insured.

It is thought from the foregoing, taken in connection with the accompanying drawings, that the construction and operation of my device will be apparent to those skilled in the art. Various changes in size, shape, proportion and details of construction may be made without departing from the spirit and scope of the appended claims.

I claim as my invention:

1. In a device of the class described, a base member, a support pivotally mounted on said base member, an arm pivotally mounted on said support, a tool sharpener carried by said arm, means for operating said sharpener, and a guide adjustably connected to said arm for limiting lateral movement of the tool to be ground.

2. In a device of the class described, a base member, a supporting plate adjustably mounted on said member, a tool sharpener support oscillatably mounted on said plate, means for confining the oscillation of said support within adjustable predetermined limits, an arm pivoted to said support, a tool sharpener carried by said arm and means for supporting a tool in position to be sharpened by said sharpener.

3. In an abrasive machine, a base, a supporting member oscillatably mounted on said base, an arm pivoted to said member, a tool sharpener carried by said arm, and means for confining the oscillations of said member within predetermined limits, said means comprising lugs, arranged on opposite sides of said member and set screws adjustably carried by said lugs and adapted to engage said base.

4. In a device of the class described, a base, a motor associated with said base, an armature shaft for said motor, a pulley on said armature shaft, a support pivoted to said base to move in a plane parallel with said armature shaft, an arm pivoted to said support, a shaft journaled in said arm in the plane of said armature shaft, a pulley on said arm, a belt engaging said pulleys, and means for causing the twisting of the intermediate portion of said belt whereby when said support moves about its pivot, said belt is flexed flatwise.

5. In a device of the class described, a base, a standard member, a head pivotally mounted to said standard member, means on said head for supporting a tool, an arm carried by said head and contour cams pivotally and slidably mounted on said arm.

6. In a device of the class described, a base member, a standard member adjustably mounted on said base member, means for pivotally mounting and supporting a head from one end thereof on said standard member, means for angularly adjusting said head, and a tool support rotatably mounted on said head.

7. In a device of the class described, a base, a standard rotatably mounted on said base, a head, means for pivotally mounting and supporting said head from one end thereof on said standard, a tool support rotatably mounted on said head, and extending laterally therefrom, contour cams and means for adjustably mounting said contour cams on said arm.

8. In a tool grinding device, a base, a support oscillatably mounted on said base, an arm pivotally mounted on said support, a shaft journaled in said arm, an abrasive member mounted on said shaft, means for rotating said shaft, means for manually oscillating said support, a tool supporting standard adjustably mounted on said base, a head pivoted thereto, a tool supporting spindle journaled therein, contour cams, means for adjustably supporting the same on said head, a guiding member carried by said arm, a guide adjustably mounted on said arm and adapted to engage one of said cams for guiding the movement of said abrasive member.

9. In a device of the class described, a base, a support pivotally mounted on said base, an arm pivotally mounted on said support, a shaft, journals for said shaft carried by said arm, a grinding element operated by said shaft, means for operating said grinding element, a guiding member carried by said arm, a guide adjustably mounted on said member, and a guiding finger carried by said arm.

10. In a device of the class described, a supporting member, a grinding element carried by said member, means for operating said element, a head, means for pivotally supporting the same, a tool holding spindle pivotally mounted on said head and adapted to support a tool to be ground, an arm secured to said head, a contour cam adjustably mounted on said arm, a guiding member carried by said supporting member and provided with means for engaging said cam for guiding said grinding element in one plane, and a guiding finger adapted to engage the tool while it is being ground to guide said grinding element in another plane.

11. In a grinding device for milling cutters, a support for holding the milling cutter head gear, means for angularly adjusting said support, a grinding element, means for operating the same, means for moving said grinding element along the blades of said head for sharpening the same and means engaging said blades for guiding the travel of said element along said blades.

JOHN P. SINGISER.